United States Patent
Sekioka et al.

(10) Patent No.: US 6,899,752 B2
(45) Date of Patent: May 31, 2005

(54) LATENT IMAGE PRINTING INK COMPOSITION, PRINTS CONTAINING LATENT IMAGES RECORDED WITH THE INK COMPOSITION, AND LATENT IMAGE DATA-BASED DECIPHERING METHOD AND LATENT IMAGE DATA DECIPHERING DEVICE

(75) Inventors: Chiaki Sekioka, Inagi (JP); Muneo Maetani, Inagi (JP); Yoichi Hirasawa, Inagi (JP)

(73) Assignees: Fujitsu Limited, Kawasaki (JP); Fujitsu Isotec Limited, Tokyo (JP)

( * ) Notice: Subject to any disclaimer, the term of this patent is extended or adjusted under 35 U.S.C. 154(b) by 0 days.

(21) Appl. No.: 10/439,319

(22) Filed: May 16, 2003

(65) Prior Publication Data

US 2003/0220419 A1 Nov. 27, 2003

Related U.S. Application Data

(63) Continuation of application No. PCT/JP01/10065, filed on Nov. 16, 2001.

(30) Foreign Application Priority Data

Nov. 16, 2000 (JP) ........................................ 2000-349849

(51) Int. Cl.[7] ............................................. C09D 11/10
(52) U.S. Cl. ................. 106/31.32; 106/31.64; 106/31.41; 106/31.72
(58) Field of Search .......................... 106/31.32, 31.64, 106/31.41, 31.72

(56) References Cited

U.S. PATENT DOCUMENTS

| | | | | |
|---|---|---|---|---|
| 5,084,205 A | * | 1/1992 | Auslander .............. | 252/301.16 |
| 5,478,381 A | * | 12/1995 | Ohiwa et al. ............... | 524/148 |
| 5,990,197 A | * | 11/1999 | Escano et al. .............. | 523/160 |
| 6,149,719 A | * | 11/2000 | Houle ...................... | 106/31.14 |
| 6,494,950 B1 | * | 12/2002 | Fujita et al. ................ | 106/499 |
| 6,576,155 B1 | * | 6/2003 | Barbera-Guillem .... | 252/301.36 |
| 6,613,403 B2 | * | 9/2003 | Tan et al. ..................... | 428/29 |
| 2002/0195586 A1 | * | 12/2002 | Auslander et al. ..... | 252/301.16 |

FOREIGN PATENT DOCUMENTS

| | | |
|---|---|---|
| JP | 5-190282 | 7/1993 |
| JP | 5-190283 | 7/1993 |
| JP | 7-61136 | 3/1995 |
| JP | 7-164729 | 6/1995 |
| JP | 9-183927 | 7/1997 |
| JP | 2000-160072 | 6/2000 |

* cited by examiner

*Primary Examiner*—David Sample
*Assistant Examiner*—Veronica F. Faison
(74) *Attorney, Agent, or Firm*—Armstrong, Kratz, Quintos, Hanson & Brooks, LLP

(57) ABSTRACT

A latent image ink composition including an organic fluorescent substance which responds to an excitation wavelength range of 600–850 nm and emits fluorescence in a wavelength range of 651–900 nm, a quencher, and a curing resin composition, prints which comprise a substrate and a latent image formed from the ink composition on the substrate, and a latent image data deciphering apparatus and latent image data deciphering method, provided with an emitting element for irradiating the prints with the excitation wavelength, a receiving element for detecting the emission of fluorescence in the wavelength range emitted from the cured ink of the print, and a computer processor for deciphering the detected emission of fluorescence against a standard value. Discrimination of the genuineness of articles can be accomplished reliably without the knowledge of third parties.

6 Claims, No Drawings

LATENT IMAGE PRINTING INK COMPOSITION, PRINTS CONTAINING LATENT IMAGES RECORDED WITH THE INK COMPOSITION, AND LATENT IMAGE DATA-BASED DECIPHERING METHOD AND LATENT IMAGE DATA DECIPHERING DEVICE

CROSS-REFERENCE TO RELATED APPLICATIONS

This application is based upon and claims priority from Japanese Patent Application No. 2000-349849, filed on Nov. 16, 2000, the contents being incorporated herein by reference, and a continuation of PCT/JP01/10065 filed on Nov. 16, 2001.

BACKGROUND OF THE INVENTION

1. Field of the Invention

The present invention relates to an ink composition comprising an organic fluorescent substance with specific luminescent properties and, particularly, to an ink composition for latent images, especially an ink composition for preventing forgery of images, to prints containing latent images formed from the ink composition, and to a deciphering method and device based on latent image data on prints whereby information recorded as a latent image is obtained and deciphered.

2. Description of the Related Art

In recent years, numerals, letters, patterns, symbols, marks and the like have been recorded on valuable papers such as paper currency, stock certificates, bonds, postage stamps, exchange checks and the like, ID cards, credit cards and cash cards, or company documents, and products or commodities in order to prevent their forgery, manage their maintenance and facilitate their handling.

An example of known means for achieving this involves coating of inks containing fluorescent substances that are colorless but emit light upon exposure to ultraviolet rays, in order to prevent forgery of valuable papers such as those mentioned above, or to determine the genuineness of the fluorescent substance-coated objects (Japanese Unexamined Patent Publication SHO No. 62-24924, Japanese Unexamined Patent Publication SHO No. 62-50790, Japanese Unexamined Patent Publication HEI No. 10-289287, Japanese Unexamined Patent Publication HEI No. 11-80632).

In such means, however, the light emitted upon exposure to ultraviolet rays is visible light which renders the sections recorded with fluorescent substances visible, and therefore a disadvantage has existed in terms of maintenance management, such as preventing forgery.

Japanese Unexamined Patent Publication SHO No. 61-18231 describes a recording sheet characterized in that a latent image is recorded with a fluorescent powder composed of regularly distributed crystals that emit light in the infrared region upon excitation by infrared rays, and since the latent image is not visible to the naked eye and the fluorescent body used emits light in the infrared range under exposure to infrared rays, it satisfies the desired function of preserving privacy during the procedure of reading the latent image-bearing recording sheet.

However, the fluorescent powder used in this case is an inorganic metal-based fluorescent body which requires high energy for light emission, while stable measurement cannot be achieved due to the low degree of fluorescence, and the hardness of the material renders it poorly resistant to abrasion by parts in the printing device.

Japanese Unexamined Patent Publication No. 2000-129185 describes an invisible ink composition comprising an invisible material which absorbs light in the wavelength range of 650–715 nm and emits light in the wavelength range of 670–720 nm, containing at least one non-complexed invisible metal phthalocyanine fluorescent body, and an ink vehicle including water and at least one organic solvent, wherein invisible images (latent images) are recorded on bond documents with the invisible ink composition to manage their maintenance.

However, the material lacks durability because it employs an invisible dye with an organic solvent and, therefore, when used for purposes that require high durability, such as in paper currency or in documents or articles that experience rough conditions during the treatment or conveying steps, the clarity of detected images has tended to significantly deteriorate, causing a problem for detection and deciphering of the latent images.

SUMMARY OF THE INVENTION

It is an object of the present invention to overcome the disadvantages of the prior art described above and to provide an ink composition whereby numerals, letters, color tones, patterns, symbols, marks, bar codes and the like which cannot be seen by the human eye under white light or even under ultraviolet or infrared rays (According to the present invention, "latent image" refers to numerals, letters, color tones, patterns, symbols, marks, bar codes, etc. which cannot be seen by the naked eye under ordinary conditions and are applied onto a substrate by some means.), are recorded onto sheets such as paper currency, stock certificates, insurance certificates, ID cards and documents, cards made of wood, plastic, metal, IC chips or the like, as well as other types of articles, and particularly a durable ink composition which allows accurate reading for detection and deciphering of data (latent image data) recorded as such invisible marks (latent images), as well as printed objects such as sheets, cards and articles bearing latent images produced with the latent image ink composition printed on substrates, and a method and device for deciphering latent image data on such substrates and discriminating their genuineness based on the latent images.

The invention comprises the following means as a solution to the problems described above.

Firstly, the invention provides a latent image ink composition comprising an organic fluorescent substance which responds to an excitation wavelength range of 600–850 nm and emits fluorescence in a wavelength range of 651–900 nm, a quencher, and a curing resin composition.

Secondly, the invention provides the aforementioned latent image ink composition wherein the organic fluorescent substance contains one or more compounds selected from the group consisting of naphthothiazolium, benzothiazolium, benzindolium and cyan-based compounds.

Thirdly, the invention provides the aforementioned latent image ink composition wherein the quencher contains one or more compounds selected from the group consisting of carotene-based compounds, amine-based compounds, phenol-based compounds, nickel complexes and sulfides.

Fourthly, the invention provides the aforementioned latent image ink composition wherein the curing resin composition is selected from the group consisting of ultraviolet curing, visible light curing, infrared curing, oxidation curing, thermosetting and hygroscopic setting resin compositions.

Fifthly, the invention provides the aforementioned latent image ink composition wherein the ultraviolet curing resin composition contains one or more resin compositions selected from the group consisting of resin compositions including substituted or unsubstituted monomers with unsaturated groups such as acrylic or methacrylic groups and/or prepolymers consisting of such monomers and vinyl-based monomers such as unsaturated polyesters and styrene, and thiol-olefin based resin compositions.

Sixthly, the invention provides the aforementioned latent image ink composition which comprises naphthothiazolium as the organic fluorescent substance, a nickel complex as the quencher and a resin composition composed of an acrylic acid monomer and acrylic acid ester oligomer as the ultraviolet curing resin composition.

Seventhly, the invention provides a print comprising a substrate and a latent image formed from the aforementioned latent image ink composition by printing and curing on the substrate.

Eighthly, the invention provides the aforementioned print which is in color.

Ninthly, the invention provides a print comprising a substrate and a latent image formed from the aforementioned latent image ink composition by printing and curing on the substrate, and also comprising a layer formed from a heat-sensitive or pressure-sensitive coloring ink composition either between the substrate and the latent image or on the latent image.

Tenthly, the invention provides a print comprising the aforementioned latent image formed from the latent image ink composition, which is also further provided with a cured protective film on the surface.

Eleventhly, the invention provides a print comprising the aforementioned latent image formed from the latent image ink composition, wherein the cured protective film includes a hindered amine-containing ultraviolet cured film.

Twelfthly, the invention provides a method for deciphering latent image data on a print, which method comprises a step of irradiating a print according to the invention with excitation light of a wavelength in the range of 550–850 nm, a step of detecting the emission of fluorescence in a wavelength range of 651–900 nm emitted from the cured ink of the print, and/or detecting the latent image, and a step of deciphering the detected emission of fluorescence and/or the latent image against a preset standard value.

Thirteenthly, the invention provides an apparatus for deciphering latent image data on a print, which apparatus comprises an emitting element for irradiating a print according to the invention with excitation light of a wavelength in the range of 550–850 nm, a receiving element for detecting the emission of fluorescence in a wavelength range of 651–900 nm emitted from the cured ink of the print, and/or detecting the latent image, and a computer processor for deciphering the detected emission of fluorescence and/or the latent image against a preset standard value.

Fourteenthly, the invention provides the aforementioned apparatus for deciphering latent image data, wherein the apparatus for deciphering latent image data is an apparatus for discriminating the genuineness of prints.

Fifteenthly, the invention provides the aforementioned apparatus for deciphering latent image data according to the invention, which further comprises a filter which controls the wavelength of light emitted from the emitting element and the wavelength of light received by the receiving element to within 10 nm of their respective maximum values.

DETAILED DESCRIPTION OF THE PREFERRED EMBODIMENTS

The present invention will now be explained in greater detail.

Generally speaking, visible light (violet to red) lies in the wavelength range of 400–650 nm, ultraviolet light in the wavelength range of 360–400 nm and shorter and infrared light in the wavelength range of 760–800 nm and longer. Light rays in the wavelength range of 600–650 nm are technically in the visible light range by definition, but are in fact very difficult to see under normal conditions. Light rays in the wavelength range of 651–759 nm are referred to as "near infrared" and are even more difficult to see with the naked eye.

The organic fluorescent substance used according to the invention is an organic fluorescent substance that emits fluorescence in a non-visible wavelength range of 651–900 nm which is longer than the near infrared wavelength range, in response to an excitation wavelength in a wavelength range of 600–850 nm, i.e. the range of visible light that is difficult to see with the naked eye under ordinary conditions, the near infrared region and the infrared region.

The wavelength irradiated to obtain the latent image data on the substrate recorded with the latent image ink composition of the invention is in the wavelength range of 600–850 nm, preferably 630–830 nm and more preferably 651–800 nm.

The difference between the excitation wavelength and the fluorescent wavelength is from about 30 to 100 nm.

The organic fluorescent substances to be used for the invention include naphthothiazolium, benzothiazolium, benzindolium and cyan-based compounds, and specifically there may be mentioned 1H-benz[e]indolium-2-[7-(1,3-dihydro-1,1,3-trimethyl-2H-benz [e]indol-2-ylidene)-1,3,5-heptatrienyl]-1,1,3-trimethyl perchlorate ($C_{37}H_{37}N_2.ClO_4$) (excitation wavelength: 780 nm, emission wavelength: 824 nm), 1H-benz[e]indolium-2-[7-(1,3-dihydro-1,1-dimethyl-3-(4-sulfobutyl)-2H-benz [e]indol-2-ylidene)-1,3,5-heptatrienyl]-1,1-dimethyl-3-(4-sulfobutyl)-hydroxide sodium salt ($C_{43}H_{48}N_2O_6S_2.Na$) (excitation wavelength: 795 nm, emission wavelength 838 nm), naphtho[2,3-d]thiazolium-2-[2-[2-(diphenylamino)-3-[[3-(4-methoxy-4-oxobutyl)naphtho [d]thiazol-2(3H)-ylidene]ethylidene]-1-cyclopenten-1-yl]ethenyl]-3-(4-methoxy-4-oxobutyl) perchlorate ($C_{53}H_{48}N_3O_4S_2.ClO_4$)(excitation wavelength: 830 nm, emission wavelength: 860 nm), benzothiazolium-5-chloro-2-[2-[3-[(5-chloro-3-ethyl-2(3H)-benzothiazolidene)ethylidene]-2-(diphenylamino)-1-cyclopenten-1-yl]ethenyl]-3-ethyl perchlorate ($C_{39}H_{34}Cl_2N_3S_2.ClO_4$) (excitation wavelength: 810 nm, emission wavelength: 860 nm), 3H-indolium-2-[5-(1,3-dihydro-1,3,3-trimethyl-2H-indol-2-ylidene)-1,3-pentadienyl]-1,3,3-trimethyl iodide ($C_{27}H_{31}N_3.I$) (excitation wavelength: 650 nm, emission wavelength: 680 nm) and benzothiazolium-3-ethyl-2-[7-(3-ethyl-2(3H)-benzothiazolidene)-1,3,5-heptatrienyl] perchlorate ($C_{25}H_{25}N_3S_2.I$) (excitation wavelength: 765 nm, emission wavelength: 850 nm), as well as other cyanine-based compounds such as 3,3'-dipropylthiadicarbocyanine (excitation wavelength: 622 nm, emission wavelength: 670 nm).

The amount of the organic fluorescent substance to be added to the ink composition of the invention may be 0.01–3 wt % and preferably 0.1–2 wt % based on the total weight of the resin component and the organic fluorescent substance of the ink composition.

As curing resin compositions for the invention there may be used ultraviolet curing, visible light curing, infrared curing, electron beam curing, oxidation curing, thermosetting and hygroscopic setting paints, and the like.

Ultraviolet curing, visible light curing and infrared curing resin compositions to be used for the invention include publicly known resin compositions, for example, resin compositions including substituted or unsubstituted monomers with unsaturated groups such as acrylic or methacrylic groups and/or prepolymers consisting of such monomers and vinyl-based monomers such as unsaturated polyesters and styrene, and thiol-olefin based resin compositions.

Ultraviolet curing resin compositions used for the invention may contain, in ranges which facilitate or do not impede the object of the invention, photosensitizing agents, photostabilizers (ultraviolet absorbers), antioxidants, peroxide decomposers, fillers, surfactants, fungicides, preservatives and the like, for the purpose of increasing the sensitivity to ultraviolet rays to promote curing of the resin compositions. Specifically, they may be added in ranges such that the latent image recorded by the ink composition of the invention is not recognizable, and in ranges such that the function of the organic fluorescent substance of responding to an excitation wavelength range of 600–850 nm and emitting fluorescence in a non-visible wavelength range of 651–900 nm which is longer than the near infrared wavelength range, is either reinforced or maintained, and at least not impeded.

Photosensitizing agents which may be used in embodiments of the invention include publicly known photosensitizing agents such as those which are diacetyl-based, benzophenone-based, benzoin-based, benzoinalkylether-based, azobisisobutyronitrile-based, benzoyl peroxide-based, etc.

Ultraviolet absorbers which may be used in embodiments of the invention serve to absorb ultraviolet rays and thereby protect the cured ink composition latent image from deterioration. These include publicly known ultraviolet absorbers such as the benzophenone-based compounds (2-(2-hydroxy-3,5-di-t-amylphenyl)-2H-benzotriazole and isooctyl-3-(3-(2H-benzotriazol-2-yl)-5-t-butyl-4-hydroxyphenyl propionate); the benzotriazole-based compound (2-[2-hydroxy-3,5-di(1,1-dimethylbenzyl)phenyl]-2H-benzotriazole); oxalic anilide-based compounds, cyanoacrylate-based compounds and the triazine-based compounds (2-[4-[(2-hydroxy-3-dodecyloxypropyl)oxy]-2-hydroxyphenyl]-4,6-bis(2,4-dimethylphenyl-1,3,5-triazine) and 2-[4-[(2-hydroxy-3-tridecyloxypropyl)oxy]-2-hydroxyphenyl]-4,6-bis(2,4-dimethylphenyl-1,3,5-triazine)).

As examples of other resin compositions to be used for the invention there may be mentioned resin compositions containing alkyd resins, oil-modified epoxy resins, rosin-modified phenol resins, polymerized linseed oil varnishes and polymerized castor oil, which undergo oxidative polymerization, resin compositions containing unsaturated polyester and styrene monomers or unsaturated monomers such as acrylic acid esters with metal salts (reaction promoters), which cure by radical polymerization in the presence of organic peroxides (functioning as polymerization initiators and curing agents), resin compositions containing unsaturated polyesters, unsaturated monomers and sensitizing agents, which undergo ultraviolet polymerization, resin compositions containing unsaturated polyesters and unsaturated monomers, which undergo polymerization with an electron beam, resin compositions containing alkyd resins and acrylic resins with amino resins as crosslinking agents and acid catalysts, which undergo ordinary temperature curing or heat curing, hygroscopic curing urethane resin compositions obtained by reaction of bifunctional and trifunctional isocyanates and water, amine or polyol curing urethane resin compositions, oxidative polymerizing urethanated alkyd resin compositions, epoxy resin compositions containing epoxy resins, metal salts and amines, which cure at ordinary temperature or by heat reaction, and epoxy resin compositions containing acids or acid anhydrides and epoxy resins.

As mentioned above, these resin components may be used together with various additives suitable for addition to ultraviolet curing resin compositions, as selected according to the need.

Photostabilizers which may be used in embodiments of the invention serve to capture alkyl radicals or peroxide radicals which cause deterioration of latent images, without absorbing ultraviolet rays of 290 nm and above, and thereby protect the cured ink composition latent image from deterioration. Such photostabilizers include hindered amines (for example, Tinuvin™ 292 and Tinuvin™ 123, both commercially available from Ciba Geigy).

The present invention is a latent image ink composition also comprising a quencher in an amount effective to exhibit quenching action against the organic fluorescent substance.

A quencher acts to restore singlet oxygen converted from triplet oxygen in the air after the chromophore of the ink composition (carbonyl group, nitro group, azo group, etc.) which has been excited by absorption of ultraviolet rays emits fluorescent light.

That is, it makes a highly significant contribution to improving the action of prolonged retention of the fluorescent emitting ability of the organic fluorescent substance.

By using a quencher together with the organic fluorescent substance, it is possible to maintain the fluorescent properties necessary for deciphering and discriminating genuineness of a latent image recorded on a substrate, without deterioration of the organic fluorescent substance, over long periods and even when it is exposed to light rays such as ultraviolet, visible or infrared rays from the surrounding environment. The action of the quencher can also maintain the fluorescent properties required of the organic fluorescent substance over long periods without deterioration, even when heated to above an ordinary temperature.

An amount of quencher effective to exhibit quenching action against the organic fluorescent substance is the amount necessary to achieve an excitable state for infrared rays of 600–850 nm by reaction between the organic fluorescent substance and the quencher, which is ideally an equivalent molar amount with respect to the organic fluorescent substance, and in order to produce such an amount in the ink composition it may be added at 0.02–6 wt % and preferably 0.1–4 wt % based on the total of the resin component, organic fluorescent substance and quencher of the ink composition. That is, the quencher may be added in a range from an equivalent amount to twice the amount of the organic fluorescent substance based on weight.

As quenchers to be used for the invention there may be mentioned carotenes such as β-carotene, isozeaxanthin and $C_{30}$-carotenoids; amines such as diethylamine, triethylamine and DABCO; phenols such as a-tocopherol, 2,3,6-triphenylphenol and 2,6-di-tert-butyl-4-methylphenol; dithiobenzyl or bis(diisopropyldiethiophosphate) Ni(II) complex; and sulfides such as diethylsulfide. Nickel complex quenchers have a slight but visible green coloring effect, but will not result in visible latent images so long as they are used in the low amount mentioned above.

Ni complex-based quenchers exhibit particularly excellent effects among the aforementioned quenchers.

The latent image ink composition of the invention employs one or more compounds selected from the group consisting of naphthothiazonium, benzothiazonium, benzindolium and cyan-based compounds as organic fluorescent substances, employs one or more compounds selected from the group consisting of carotene-based compounds, amine-based compounds, phenol-based compounds, nickel complexes and sulfides as quenchers, and may also employ a curing resin composition selected from the group consisting of ultraviolet curing, visible light curing, infrared curing, electron beam curing, oxidation curing, thermosetting and hygroscopic setting resin compositions. Among these, there may be employed, as ultraviolet curing resin compositions, one or more resin compositions selected from the group consisting of resin compositions including substituted or unsubstituted monomers with unsaturated groups such as acrylic or methacrylic groups and/or prepolymers consisting of such monomers, with vinyl-based monomers such as unsaturated polyesters and styrene, and thiol-olefin based resin compositions, and there may also be included the various additives mentioned above, such as other photosensitizing agents and the like.

According to a preferred mode of the latent image ink composition of the invention, it may comprise naphthothiazonium as the organic fluorescent substance, a nickel complex as the quencher and a resin composition containing an acrylic acid monomer and acrylic acid ester oligomer as the ultraviolet curing resin composition.

A print comprising a substrate and a latent image formed from the aforementioned latent image ink composition printed and cured on the substrate may also include a layer formed from a heat-sensitive or pressure-sensitive coloring ink composition either between the substrate and the latent image or on the latent image. The layer is colored by contact and reaction with a coloring agent or developer upon application of heat or pressure, with the coloring ink producing a display or forming an image selected from among letters, symbols, numerals, codes, graphics, images and combinations thereof. Specifically, these may be prints of the publication date or location of the print, symbol marks, characters or the like. Regardless of their purpose, they must not impede the receiving and emitting function according to the invention.

The layer formed from the heat-sensitive or pressure-sensitive coloring ink composition described above may be formed by a commonly known method.

A heat-sensitive ink composition is formed, for example, by separately dispersing a developer (such as a phenol compound with one or more phenolic hydroxyl groups) and a coloring agent (leuco dye, fluorane dye, etc.) in a binder composed of a water-soluble polymer (polyvinyl alcohol, polyacrylamide, starch, etc.), and then adding and mixing therewith as necessary various aids such as sensitizing agents, fillers, waxes, lubricants, image preserving stabilizers, high-oil-absorptive dispersing agents, surfactants, release agents, defoaming agents or the like, for improved coloring sensitivity. A layer of the heat-sensitive ink composition is formed by using a coater for coating above the substrate and below the latent image, or above the latent image.

A pressure-sensitive ink composition layer includes layers comprising a coloring agent obtained by dissolving an electron donor substance (coloring agent: leuco dye) in an oil (alkylnaphthalene, diarylalkane, etc.) and encapsulating the solution in a gelatin membrane by coacervation, or encapsulating the solution by an in-situ method (capsules of urea, melamine-formaldehyde, etc.) or interfacial polymerization (capsules obtained from reaction products of polyvalent isocyanates and active hydrogen), and layers comprising a developer (an acidic electron acceptor substance which undergoes coloration upon reaction with a leuco dye or the like), a pigment (kaolin, calcium carbonate, etc.) and a latex or other binder.

A cured protective film formed on the cured ink composition layer of the invention must be hard and tough, water-resistant, fouling resistant and scratch-resistant, and capable of protecting the latent image, withstanding repeated use and permitting reliable discrimination of the latent image. The cured protective film must not impede the object of the invention, including both the light receiving and emitting functions. The resin composition for a cured protective film of the invention may be obtained using an acrylic, polyester, polyurethane resin or the like which performs the function described above, among which are preferred acrylate-based monomers, or mixtures of acrylate-based monomers with other unsaturated monomers which are polymerizable therewith, and ultraviolet curing resin compositions are especially preferred. As examples of monomers for ultraviolet curing resins there may be mentioned 1,4-butanediol diacrylate, 1,6-hexanediol diacrylate, diethyleneglycol diacrylate, neopentylglycol diacrylate, polyethyleneglycol 400 diacrylate, tripropyleneglycol diacrylate, trimethylolpropane triacrylate, pentaerythritol triacrylate, pentaerythritol tetraacrylate and dipentaerythritol hexaacrylate. Among these, tripropyleneglycol diacrylate and hindered amine-containing ultraviolet curing resins exhibit the aforementioned properties with particularly excellent effectiveness.

Various publicly known hindered amines may be used. A hindered amine functions to protect the cured ink from light, oxygen and other causes of deterioration, thereby improving the durability of the quencher and the organic fluorescent substance.

The curing protective coating formed on the ink surface, which is preferably a film composed of a hindered amine-containing ultraviolet curing paint, must not allow visibility of the latent image, while protecting the functions of the organic fluorescent substance and quencher to extend their usable life, and it is preferably transparent. There are no particular restrictions on the thickness of the film so long as the effect described above is exhibited and, for example, it may be 0.1–3.0 $\mu$m and preferably 0.5–1.5 $\mu$m.

The paint composition (curing protective film) may also contain the photosensitizing agents, photostabilizers (ultraviolet absorbers), antioxidants, peroxide decomposers, fillers, surfactants, fungicides, preservatives and the like added to the ink composition, in ranges such that the latent image formed by the ink composition of the invention is not recognizable, and limited to amounts that reinforce or at least do not impede excitation by light in a wavelength range of 600–850 nm and fluorescent light emission in a wavelength range of 651–900 nm.

The latent image recorded by the ink composition of the invention may consist of numerals, letters, color tones, patterns, symbols, marks and the like which cannot be seen or are difficult to see with the human eye, not only under white light but also under ultraviolet or infrared light.

The object (substrate) on which the latent image is recorded may be a thin, flat sheet such as paper currency, a stock certificate, insurance certificate, ID card, document or the like, or a three-dimensional article.

When the latent image is recorded with the ink composition of the invention onto paper currency, a stock certificate or the like, the provided ink composition is durable and permits accurate reading, especially for detecting and deciphering of invisible latent images.

Since a latent image recorded with the ink composition of the invention cannot be seen by the human eye under white light, or even under ultraviolet or infrared light, its genuineness can be deciphered reliably without knowledge by third parties.

A latent image of the invention may be used as a means of deciphering genuineness, but also, for example by recording information for handling instructions on boxes for packing of products or product parts, it is possible to carry out product transport or step processing without leaking company knowledge to third parties. The latent image is invisible under ordinary light and therefore does not impair the outer appearance.

The method used for printing (applying, coating or recording) of the latent image onto a substrate may be any publicly known printing means. Printing methods include handwriting, intaglio, relief, spray gun, ink jet and other forms of printing.

The print may be in black-and-white or color, but a color print gives a greater effect in terms of preventing discernibility of the presence of the latent image.

The light emitting element used in a deciphering device according to the invention may be any of various publicly known light sources such as an infrared lamp, red light emitting diode (LED), laser diode (LD) or the like, so long as it is capable of emitting light in a wavelength range of 600–850 nm which is unrecognizable under ordinary conditions. A red light emitting diode is small and economical and thus allows the device to be downsized and portable.

Articles bearing latent images with the latent image ink composition of the invention may be used in a deciphering device according to the invention for easy and safe maintenance management, processing management and transport/handling of the articles bearing the latent images secretly applied thereto, without knowledge by third parties.

For deciphering of latent image data from prints printed using the latent image ink composition of the invention, the print is irradiated with excitation light in a wavelength range of 550–850 nm, and the emission of fluorescence in a wavelength range of 651–900 emitted from the cured ink of the print, and/or the latent image, is detected, after which the detected emission of fluorescence and/or the latent image is deciphered against a preset standard value, to allow deciphering of the latent image data on the print.

This method may be effectively utilized for discriminating the genuineness of various tickets or cards used by stadiums, game centers and financial institutions.

In the genuineness-discriminating method described above, it is possible to increase the discrimination precision by detecting both the printed location as well as the wavelength and intensity of irradiated excitation light and its output level (for example, 2–5 V) of fluorescent light emitted from the ink.

For example, if a line is used as the latent image printed on a ticket (sheet) for detection in this method, the distance of the line from the edge of the sheet may be utilized as the measuring index (discriminating index).

Alternatively, if the latent image ink composition is printed as a security ink, the printed width (specifically, about 1–10 mm) may be utilized as one measuring index.

The printed location, shape, size etc. of the latent image may also be used simultaneously as another measuring index.

A genuineness discriminating apparatus of the invention may also comprise a filter which controls the wavelength of light emitted from the emitting element and the wavelength of light received by the receiving element to within 10–20 nm, and especially within about 10 nm, of their respective maximum values, in order to increase the secrecy of the data and enhance the detection precision. The filter used may be a publicly known color filter composed of glass, plastic or the like.

The present invention will now be explained in greater detail based on the following examples. Unless otherwise specified, the percentage values for the components for the invention refer to weight percentages, and the "parts" are parts by weight.

EXAMPLES 1–4

The components listed below were mixed, for 2 hours, to uniformity using a blender to prepare a latent image ink composition. The ink composition was coated onto a substrate (high-quality paper) to record a latent image, which was then irradiated with ultraviolet (UV) rays for crosslinked curing of the resin. The location of the latent image on the invisible ink-bearing article (print) was then irradiated with excitation light from an emitting element (LED: 300 mw output, 660±5 nm wavelength), and the fluorescence from the organic fluorescent substance in the invisible ink was received by a receiving element (semiconductor photosensor). The received light was of a wavelength of 700 nm±5 nm.

Ink Composition of Example 1

| | |
|---|---|
| Organic fluorescent substance, naphthothiazonium (thiazonium-based colorless dye) | 1% |
| Quencher (green dithiobenzyl Ni complex) | 1% |
| Polymerization initiator (azobisisobutyronitrile) | 9% |
| UV curing resin composition (mixture of 85% acrylic acid monomer, 15% methyl acrylate oligomer) | 87% |
| Photostabilizer (hindered amine) | 1% |
| Ultraviolet absorber (benzophenone-based) | 1% |

Examples 2–4 were tested in the same manner as Example 1, except for using the ink compositions shown in Table 1 below.

Comparative Examples 1 and 2

For Comparative Examples 1 and 2, the test was conducted by the method of Example 1 with the compositions shown in Table 1, containing no quencher.

The results are summarized in Table 1.

| | | Ink composition (wt %) | | | | | |
|---|---|---|---|---|---|---|---|
| | | Example 1 | Example 2 | Example 3 | Example 4 | Comp. Ex. 1 | Comp. Ex. 2 |
| Fluorescent pigment | Naphthothiazonium | 1 | 1 | 1 | 1 | 1 | 1 |
| Quencher | Green dithiobenzyl Ni complex | 1 | 0.5 | 1 | 2 | 0 | 0 |
| Ultraviolet absorber | Benzophenone-based | 1 | 1 | 0 | 1 | 1 | 1 |
| Photostabilizer | Hindered amine | 1 | 1 | 0 | 1 | 1 | 0 |
| | Polymerization initiator | 9 | 9 | 9 | 9 | 9 | 9 |
| | UV curing resin composition | 87 | 87.5 | 89 | 86 | 88 | 89 |
| Ticket light fastness | No change under indoor lighting for 8 weeks | ○ | ○ | ○ | ○ | ○ | x |
| | No change under sunlight for 8 weeks | 12 weeks | 6 weeks | 8 weeks | 12 weeks | x | x |
| Color tone | | transparent | transparent | transparent | colored | transparent | transparent |

Effect of the Invention

By utilizing the latent image printed ink composition of the invention, which also comprises a quencher, the organic fluorescent substance undergoes very little deterioration with repeated light irradiation from the emitting element and the responding fluorescent emission, under environmental conditions or even under heated conditions, such that gradual deterioration of the organic fluorescent substance may be prevented. An effect of high fluorescent emission intensity and reduced deterioration is also exhibited when a low-output light emitting diode is used as the light source. As a result, a compact, low-output photodiode may be used as the receiving element in a latent image data deciphering device (article genuineness discriminating device) to obtain precise and adequate information relating to the latent image, so that the device can be downsized and produced in a handy form.

A latent image recorded with the ink composition of the invention may consist of numerals, letters, color tones, patterns, symbols, marks and the like which cannot be seen with the human eye under white light or even under ultraviolet or infrared light, and latent images relating to substrates may be recorded as information that cannot be seen by users under ordinary light. Latent images containing various types of information may have their data read and recognized by a deciphering device comprising an emitting element, a receiving element and a comparison computer processor, and in particular an article genuineness discriminating device, to allow conveyance of information necessary for later handling while maintaining confidentiality from the eyes of third parties.

What is claimed is:

1. A latent image ink composition comprising an organic fluorescent substance which responds to an excitation wavelength range of 600–850 nm and emits fluorescence in a wavelength range of 651–900 nm, a quencher, and a curing resin composition, wherein a difference between the excitation wavelength and the fluorescence wavelength is 30–100 nm.

2. A latent image ink composition according to claim 1, wherein the organic fluorescent substance contains one or more compounds selected from the group consisting of naphthothiazolium, benzothiazolium, benzindolium and cyan-based compounds.

3. A latent image ink composition according to claim 2, wherein the quencher contains one or more compounds selected from the group consisting of carotene-based compounds, amine-based compounds, phenol-based compounds, nickel complexes and sulfides.

4. A latent image ink composition according to claim 1, wherein the curing resin composition is selected from the group consisting of ultraviolet curing, visible light curing, infrared curing, electron beam curing, oxidation curing, thermosetting and hygroscopic setting resin compositions.

5. A latent image ink composition according to claim 4, wherein the ultraviolet curing resin composition contains one or more resin compositions selected from the group consisting of resin compositions including substituted or unsubstituted monomers with unsaturated groups such as acrylic or methacrylic groups and/or prepolymers consisting of such monomers and vinyl-based monomers such as unsaturated polyesters and styrene, and thiol-olefin based resin compositions.

6. A latent image ink composition according to claim 5, which comprises naphthothiazolium as the organic fluorescent substance, a nickel complex as the quencher and a resin composition composed of an acrylic acid monomer and acrylic acid ester oligomer as the ultraviolet curing resin composition.

* * * * *